US008368925B2

(12) United States Patent
Negishi

(10) Patent No.: US 8,368,925 B2
(45) Date of Patent: Feb. 5, 2013

(54) IMAGE TRANSMISSION SYSTEM, IMAGE STORAGE DEVICE, AND RECORDING MEDIUM

(75) Inventor: Hiroaki Negishi, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 1007 days.

(21) Appl. No.: 12/357,558

(22) Filed: Jan. 22, 2009

(65) Prior Publication Data

US 2009/0195818 A1 Aug. 6, 2009

(30) Foreign Application Priority Data

Jan. 31, 2008 (JP) ................................. 2008-020637

(51) Int. Cl.
*G06F 15/00* (2006.01)
(52) U.S. Cl. ...................................... 358/1.15; 358/1.16
(58) Field of Classification Search .............. 358/1.15, 358/1.16; 348/231.2, 231.7, 143, 207.2
See application file for complete search history.

(56) References Cited

U.S. PATENT DOCUMENTS

| 6,701,351 | B1 | | 3/2004 | Gann | |
|---|---|---|---|---|---|
| 6,784,925 | B1 | * | 8/2004 | Tomat et al. | 348/207.11 |
| 6,806,978 | B1 | * | 10/2004 | Tamura et al. | 358/1.15 |
| 2004/0021902 | A1 | * | 2/2004 | Ogiwara et al. | 358/1.15 |
| 2004/0025187 | A1 | * | 2/2004 | Cannon et al. | 725/105 |
| 2004/0249956 | A1 | * | 12/2004 | Tanimoto | 709/227 |
| 2005/0243359 | A1 | * | 11/2005 | Watanabe | 358/1.13 |
| 2008/0104011 | A1 | * | 5/2008 | Shibasaki et al. | 707/1 |
| 2009/0052344 | A1 | * | 2/2009 | Fujii | 370/254 |
| 2009/0307322 | A1 | | 12/2009 | Iwasawa et al. | |
| 2010/0030860 | A1 | | 2/2010 | Iwasawa et al. | |

FOREIGN PATENT DOCUMENTS

| JP | 10-243329 A | 9/1998 |
|---|---|---|
| JP | 2001-309219 A | 11/2001 |
| JP | 2002-142184 | 5/2002 |

(Continued)

OTHER PUBLICATIONS

Japanese Office Action dated Nov. 15, 2011 (and English translation thereof) in counterpart Japanese Application No. 2010-195472.

(Continued)

*Primary Examiner* — King Poon
*Assistant Examiner* — Allen H Nguyen
(74) *Attorney, Agent, or Firm* — Holtz, Holtz, Goodman & Chick, PC

(57) ABSTRACT

An image transmission system 1 includes a digital camera 10, a PC 40, and a Web server 50. This digital camera 10 stores therein a plurality of image data, print request information, and transmission request information. Further, the digital cameral 10 determines whether the connection destination is a printing device or an external apparatus different from the printing device, when a connection with the external unit is detected. The digital camera 10 transmits image data which is associated with the print request information to the print device, when it is determined that the connection destination is the print device, and transmits image data which is associated with the transmission request information to the external apparatus, when it is determined that the connection destination is the external apparatus. PC 40 receives the transmitted image data through a communication network connection 51 and transmits it to the Web server 50.

8 Claims, 7 Drawing Sheets

FOREIGN PATENT DOCUMENTS

| | | |
|---|---|---|
| JP | 2003-023566 A | 1/2003 |
| JP | 2003-115975 A | 4/2003 |
| JP | 2003-309754 A | 10/2003 |
| JP | 2003-309788 A | 10/2003 |
| JP | 2005-020306 A | 1/2005 |
| JP | 2005-049926 A | 2/2005 |
| JP | 2005-079637 A | 3/2005 |
| JP | 2005-150892 A | 6/2005 |
| JP | 2006-197214 A | 7/2006 |
| JP | 2007-201578 A | 8/2007 |
| JP | 2007-305139 A | 11/2007 |
| JP | 2008-017035 A | 1/2008 |
| WO | WO 2008-001900 A1 | 1/2008 |

OTHER PUBLICATIONS

Japanese Office Action dated Oct. 27, 2009 and English translation thereof issued in a counterpart Japanese Application No. 2008-020637.

Japanese Office Action dated Jun. 1, 2010 and English translation thereof, issued in counterpart Japanese Application No. 2008-020637.

Japanese Office Action dated Jan. 26, 2010 and English translation thereof in counterpart Japanese Application No. 2008-020637.

Japanese Office Action dated Aug. 21, 2012 (and English translation thereof) in counterpart Japanese Application No. 2010-195472.

\* cited by examiner

| STORAGE ADDRESS | FILE NAME | PRINT DESIGNATION | NUMBER OF COPIES | TRANSMISSION DESIGNATION | TRANSMISSION LOG |
|---|---|---|---|---|---|
| 01 | img0001.jpg | 0 | 0 | 0 | 0 |
| 02 | img0002.jpg | 1 | 3 | 0 | 0 |
| 03 | img0003.jpg | 0 | 0 | 1 | 1 |
| 04 | img0004.jpg | 1 | 2 | 1 | 1 |
| 05 | img0005.jpg | 0 | 0 | 1 | 0 |
| ⋮ | ⋮ | ⋮ | ⋮ | ⋮ | ⋮ |

FIG. 9

| FILE NAME | CREATION DATE AND TIME | SIZE | UPLOAD DATE AND TIME |
|---|---|---|---|
| cimg0007.avi | 05 / 03 / 27  15 : 21 | 59,067KB | 07 / 06 / 14  09 : 05 |
| CIMG8800.AVI | 07 / 02 / 09  09 : 56 | 8,262KB | 07 / 06 / 14  09 : 05 |
| CIMG8877.MOV | 07 / 02 / 09  16 : 38 | 3,786KB | 07 / 06 / 14  09 : 06 |
| cimg8900.mov | 07 / 02 / 09  16 : 38 | 3,786KB | 07 / 06 / 14  09 : 06 |
| CIMG8879.AVI | 07 / 04 / 12  17 : 37 | 13,503KB | 07 / 06 / 14  10 : 50 |

IMAGE TRANSMISSION SYSTEM, IMAGE STORAGE DEVICE, AND RECORDING MEDIUM

This application is based on and claims the benefit of priority from Japanese Patent Application No. 2008-020637, filed on 31 Jan. 2008, the content of which is incorporated herein by reference.

BACKGROUND OF THE INVENTION

1. Field of the Invention

The present invention relates to an image transmission system for transmitting image data to another external device, which is different in primary use, an image storage device, and a recording medium.

2. Related Art

Conventionally, in order to update home pages or blogs, a user photographs a subject with a digital camera to generate image data, and uploads this image data onto a Web server.

This Web server has functions in which, after a user uploads image data through a communication network connection, the same user or other users can view this uploaded image (see Japanese Unexamined Patent Application Publication No. 2002-142184).

Incidentally, even if image data is generated by a digital camera, since the digital camera is not equipped with a network communication function, the following procedure is required so as to upload the image data. First, the image data is transferred to a personal computer by connecting the digital camera to a personal computer via a USB-compliant connection; alternatively, by having a memory card read into the personal computer. Then, by carrying out an upload operation on a screen of the personal computer, the image data is uploaded onto the Web server.

SUMMARY OF THE INVENTION

The above-described procedure, however, encounters a drawback that it is necessary to carry out the upload operation on the screen of the personal computer each time the image data is uploaded from the digital camera onto the Web server, and, accordingly, the upload operation becomes cumbersome.

It is therefore an object of the present invention to provide an image transmission system, an image storage device, and a recording medium, which enable a user to upload image data with a simple operation.

In order to solve the aforementioned problems, in accordance with a first aspect of the present invention, there is provided an image transmission system according to the present invention comprising: an image storage device comprising: an image storage means for storing a plurality of image data; an information storage means for storing print request information requesting printing of an image, and transmission request information requesting transmission of the image data to an external unit, for each of the plurality of image data stored in the image storage means; a first detection means for detecting a connection with the external unit; a connection destination determination means for determining whether the connection destination is a printing device, or an external apparatus different from the printing device, when a connection with the external unit is detected by the first detection means; a first transmission means for reading out the print request information stored in the information storage means, reading out from the image storage means image data which is associated with the print request information, and transmitting it to the print device, when it has been determined by the connection destination determination means that the connection destination is the print device; and a second transmission means for reading out the transmission request information stored in the information storage means, reading out from the image storage means image data which is associated with the transmission request information, and transmitting it to the external apparatus, when it has been determined by the connection destination determination means that the connection destination is the external apparatus. The image transmission system further comprises a first external apparatus comprising: a reception means for receiving image data transmitted by the second transmission means; and a third transmission means for transmitting to a second external apparatus, through a communication network connection, the image data received by the reception means.

Further, in accordance with a second aspect of the present invention, there is provided an image storage device comprising: an image storage means for storing a plurality of image data; an information storage means for storing print request information requesting printing of an image, and transmission request information requesting transmission of the image data to an external unit, for each of the plurality of image data stored in the image storage means; a first detection means for detecting a connection with the external unit; a connection destination determination means for determining whether the connection destination is a printing device, or an external apparatus different from the printing device, when a connection with the external unit is detected by the first detection means; a first transmission means for reading out the print request information stored in the information storage means, reading out from the image storage means image data which is associated with the print request information, and transmitting it to the print device, when it has been determined by the connection destination determination means that the connection destination is the print device; and a second transmission means for reading out the transmission request information stored in the information storage means, reading out from the image storage means image data which is associated with the transmission request information, and transmitting it to the external apparatus, when it has been determined by the connection destination determination means that the connection destination is the external apparatus.

Further, in accordance with a third aspect of the present invention, there is provided a recording medium storing therein a program executable by a computer which comprises an image storage means for storing a plurality of image data; and an information storage means for storing print request information requesting printing of an image, and transmission request information requesting transmission of the image data to an external unit, for each of the plurality of image data stored in the image storage means, to function as a first detection means for detecting a connection with the external unit; a connection destination determination means for determining whether the connection destination is a printing device, or an external apparatus different from the printing device, when a connection with the external unit is detected by the first detection means; a first transmission means for reading out the print request information stored in the information storage means, reading out from the image storage means image data which is associated with the print request information, and transmitting it to the print device, when it has been determined by the connection destination determination means that the connection destination is the print device; and a second transmission means for reading out the transmission request information stored in the information storage means, reading out from the image storage means image data which is associated with the transmission request information, and transmitting it to the external apparatus, when it has been determined by the connection destination determination means that the connection destination is the external apparatus.

BRIEF DESCRIPTION OF THE DRAWINGS

FIG. 9 is a diagram illustrating a display screen of the PC (personal computer) forming part of the embodiment.

DETAILED DESCRIPTION OF THE INVENTION

Hereinafter, one embodiment of the present invention is described with reference to the drawings.

Figure 1:
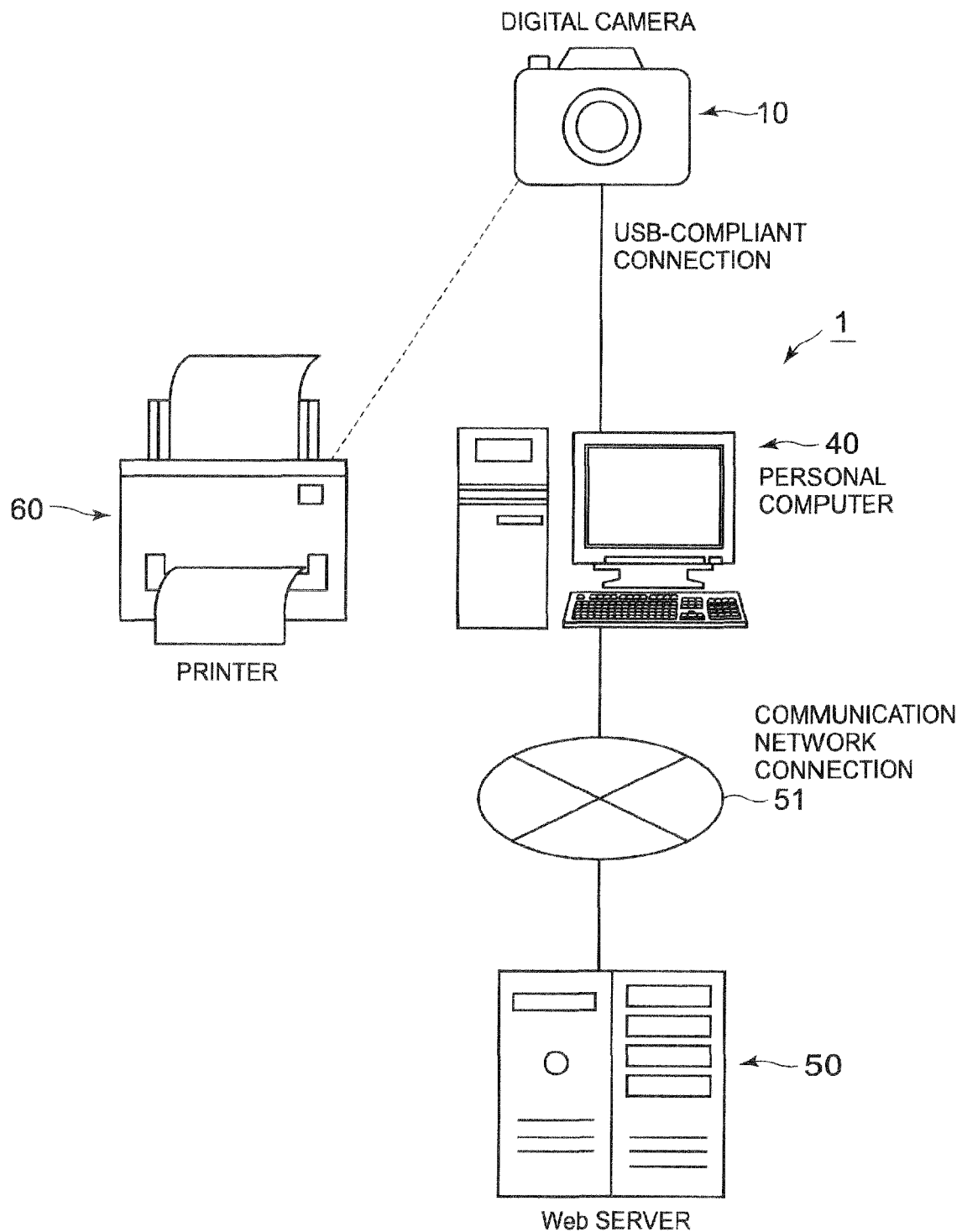
FIG. 1 is a diagram illustrating a configuration of one embodiment of an image transmission system 1 according to the present invention.

FIG. 1 is a diagram illustrating a configuration of one embodiment of an image transmission system 1 according to the present invention.

The image transmission system 1 includes a digital camera 10 as an image storage device, a personal computer (hereinafter simply referred to as a "PC") 40 as a first external apparatus connected to the digital camera, and a Web server 50 as a second external apparatus connected through a communication network connection 51 to the PC 40. This digital camera 10 is also connectable to a printer 60.

Here, the digital camera 10 and the PC 40 are connected with each other by, for example, a USB (Universal Serial Bus)-compliant connection. Furthermore, the communication network connection 51 is constituted by, for example, an Internet connection.

Figure 2:
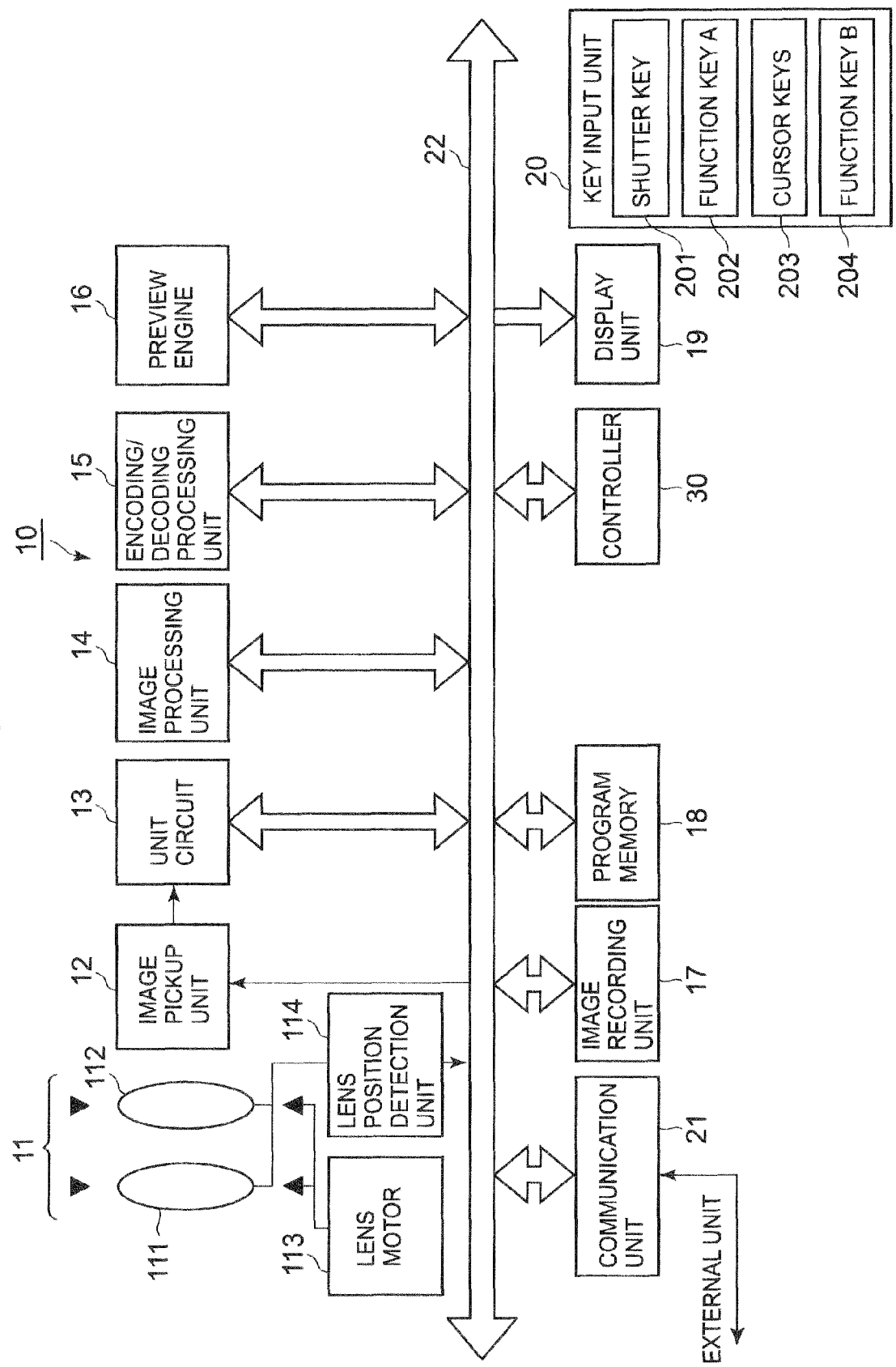
FIG. 2 is a block diagram schematically illustrating a digital camera forming part of the embodiment.

FIG. 2 is a block diagram schematically illustrating the digital camera 10.

This digital camera 10 includes an image pickup lens unit 11 as an image pickup means, an image pickup unit 12 as an image pickup means, a unit circuit 13 as an image pickup means, an image processing unit 14 as an image pickup means, an encoding/decoding processing unit 15, a preview engine 16, an image recording unit 17, a program memory 18, a display unit 19, a key input unit 20, a communication unit 21, and a controller 30 as a control means connected to each of the units 11 through 21 through a bus line 22.

The key input unit 20 is configured to include a shutter key 201, a function key A (decision instruction key) 202, a cursor key (selection instruction key) 203, and a function key B (cancellation instruction key) 204.

The image pickup lens unit 11 is equipped with optical components, and is provided with a zoom lens 111, a focus lens 112, a lens motor 113 for driving the zoom lens 111 and the focus lens 112 in response to control signals received from the controller 30, and a lens position detection unit 114 for obtaining the positions of the moved zoom lens 111 and moved focus lens 112.

The lens motor 113 moves the zoom lens 111 and the focus lens 112 forward or backward, when a focus instruction by a half-push operation of the shutter key 201 is detected or when a zoom operation of the cursor key 203 is detected.

The image pickup unit 12 is constituted by an image sensor such as CMOS or the like, placed on an optical axis of the above-described image pickup lens unit 11, and generates an image pickup signal in accordance with an optical image of a subject.

The unit circuit 13 inputs an analog image pickup signal output from the image pickup unit 12, and comprises a CDS for retaining the input image pickup signal, an Automatic Gain Control (AGC) for amplifying the input image pickup signal, an A/D Converter (ADC) for converting the amplified image pickup signal into a digital image pickup signal, and the like.

The image processing unit 14 carries out various image processing for the image pickup signal output from the unit circuit 13.

The display unit 19 is constituted by a liquid crystal panel including a driver, and displays, when the image pickup signal and a driver control signal activating the driver are input, an image based on this image pickup signal.

The preview engine 16 carries out reduction processing for the image pickup signals output from the image processing unit 14, and causes the display unit 19 to display the image thus processed. In addition to generating this kind of through image, the preview engine 16, at a time of image recording, displays on the display unit 19 an image based on image data just before being stored in the image recording unit 17.

The encoding/decoding processing unit 15, at a time of image recording, encodes signals output from the image processing unit 14 and outputs them as image data to the image recording unit 17, and additionally, at a time of image playback, decodes image data read from the image recording unit 17 and outputs them to the display unit 19.

The communication unit 21 is connected to external apparatuses such as the digital camera 10 and the printer 60 as a printing device or the PC 40 as a first external apparatus, and transmits an image file stored in the image recording unit 17.

The program memory 18 stores a program executable to carry out the processing illustrated in the below described flowchart.

Figures 3, 4:
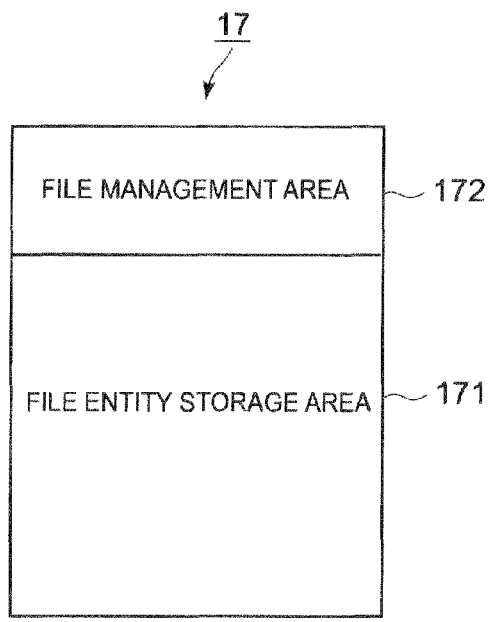
FIG. 3 is a diagram schematically illustrating an image recording unit forming part of the embodiment.
FIG. 4 is a diagram illustrating memory content of the image recording unit forming part of the embodiment.

FIG. 3 is a diagram schematically illustrating the constitution of a storage area of the image recording unit 17.

The storage area of the image recording unit 17 consists of a file entity storage area 171 as an image recording means storing a plurality of image data, and a file management area 172 as an information storage means storing information accompanying this plurality of image data.

FIG. 4 is a diagram illustrating the memory content of the file management area 172 of the image recording unit 17.

In the file management area 172, file management information is stored relating to each of a plurality of image data. This file management information consists of a storage address item 173, a file name item 174, a print designation item 175, a number of copies item 176, a transmission designation item 177, and a transmission log item 178.

The print designation item, in the case of a no print designation, is set to a flag 0, and in the case of a print designation, is set to a flag 1. That is to say, in the print designation item, print request information requesting a printing of an image is stored.

The transmission designation item, in the case of a no transmission designation, is set to a flag 0, and in the case of a transmission designation, is set to a flag 1. In other words, in the transmission designation item, transmission request information requesting a transmission of image data externally is stored.

The transmission log item, in the case of being un-transmitted, is set to a flag 0, and in the case of being sent, is set to a flag 1. In other words, in the transmission log item, transmission log information of whether the transmission of the image data was completed or not is stored.

More specifically, for example, image data of file name "img0001.jpg" is not marked for printing, and not marked for transmission. Image data of file name "img0002.jpg" is marked for 3-copy printing, and not marked for transmission. Image data of file name "img0003.jpg" is not marked for printing, is marked for transmission, and has been transmitted.

Figure 5:
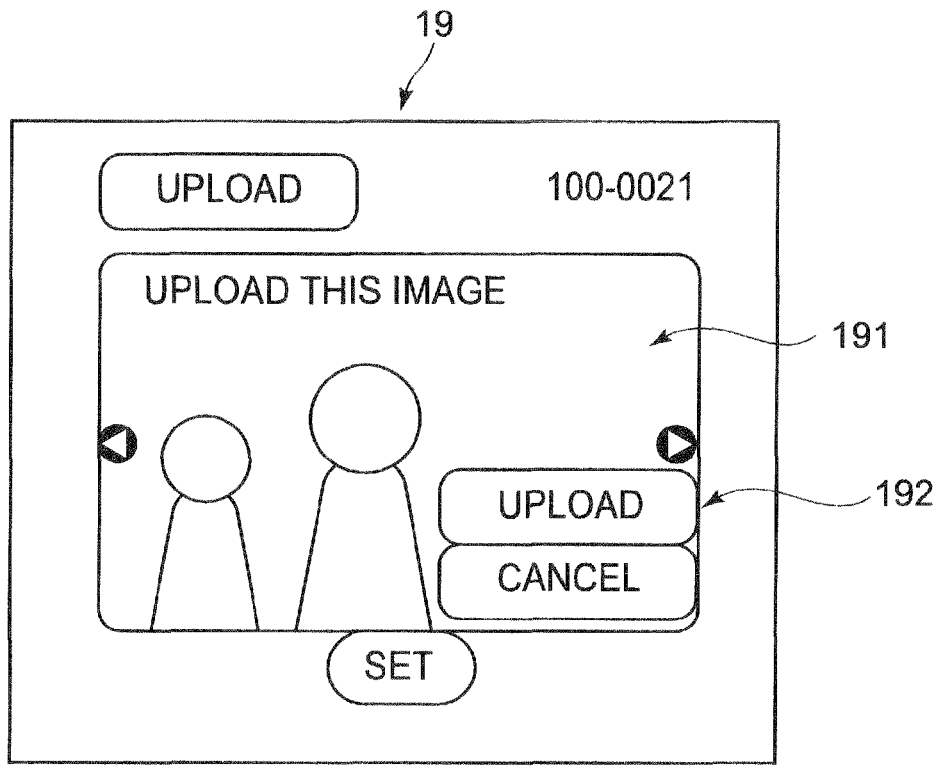
FIG. 5 is a diagram illustrating a display screen of the digital camera forming part of the embodiment.

Moreover, the above-mentioned transmission designation methods, specifically, are described hereinafter as illustrated in FIG. 5. In other words, on the display unit 19 of the digital camera 10, an image 191 based on the image data is displayed, and additionally, a selection screen 192 for prompting a user whether or not to upload this image 191 is displayed. Here, by detecting an operation of the user, when a selection of "upload" is detected, a designation of transmission is included, and in the image recording unit 17, a transmission designation item of image data (a file name) corresponding to this image is set with a flag 1. On the other hand, when a selection of "Cancel" is detected, a designation of no transmission is included, and a transmission designation item of image data (a file name) corresponding to this image is set with a flag 0. Moreover, this configuration processing is carried out with a user interface of the same type as print reservation processing within the public domain.

Figure 6:
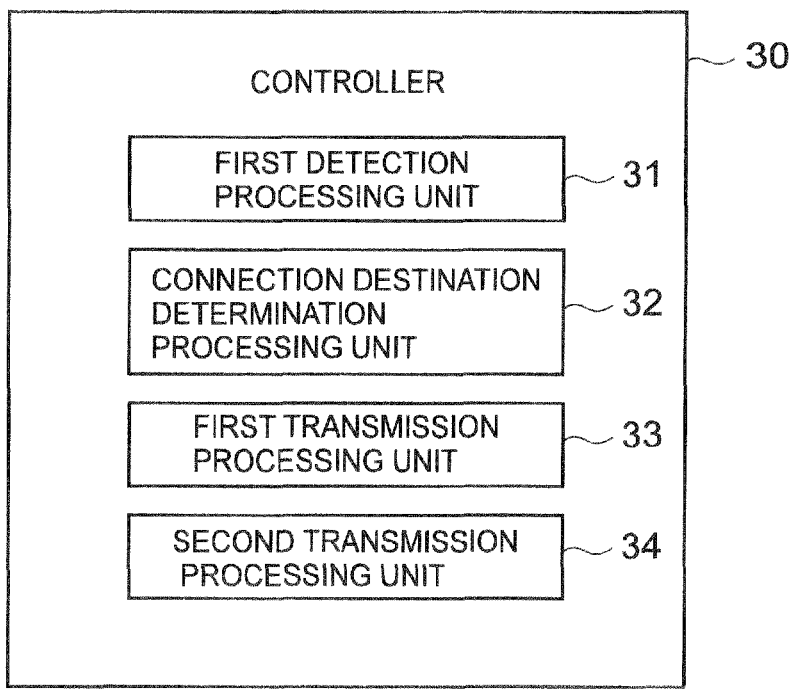
FIG. 6 is a block diagram illustrating configuration of the controller forming part of the embodiment.

FIG. 6 is a block diagram illustrating a configuration of the controller 30.

The controller 30 is a one-chip microcomputer, and includes a first detection processing unit 31 as a first detection means, a connection destination determination processing unit 32 as a connection destination determination means, a first transmission processing unit 33 as a first transmission means, and a second transmission processing unit 34 as a second transmission means.

The first detection processing unit 31, when the communication unit 21 connects externally, detects this connection with an external unit.

The connection destination determination processing unit 32, when a connection with an external unit is detected by the first detection processing unit 31, determines whether the connection destination is a printing device or an external apparatus other than the printing device, based on data transmitted from the connection destination.

For example, in the case of receiving data based on a PictBridge (registered trademark)-compliant connection from a connection destination, a determination is made that the connection destination is a printing device. On the other hand, in the case of detecting a reception of data other than data based on the PictBridge (registered trademark)-compliant connection, a determination is made that the connection destination is a PC.

The first transmission processing unit 33, in the case of determining that the connection destination is a printing device by the connection destination determination processing unit 32, reads a state of a flag of the print request information stored in the file management area 172 of the image recording unit 17, reads image data corresponding to this print request information from the file entity storage area 171, and transmits it to the printing device.

The second transmission processing unit 34, in the case of determining that the connection destination is not a printing device by the connection destination determination processing unit 32, reads a state of the flag of transmission request information stored in the file management area 172 of the image recording unit 17, reads image data corresponding to this transmission request information from the file entity storage area 171, and transmits it to the external apparatus. Moreover, each of the processing programs of the first detection processing unit 31, the connection destination determination processing unit 32, the first transmission processing unit 33, and the second transmission processing unit 34 is stored in the program memory 18, and, according to need, loaded and executed by an instruction of the controller 30.

The Web server 50 has identification information enabling identification of this Web server 50 on the communication network connection 51. This identification information is, for example, a URL (Uniform Resource Locator) or an IP address.

Figure 7:
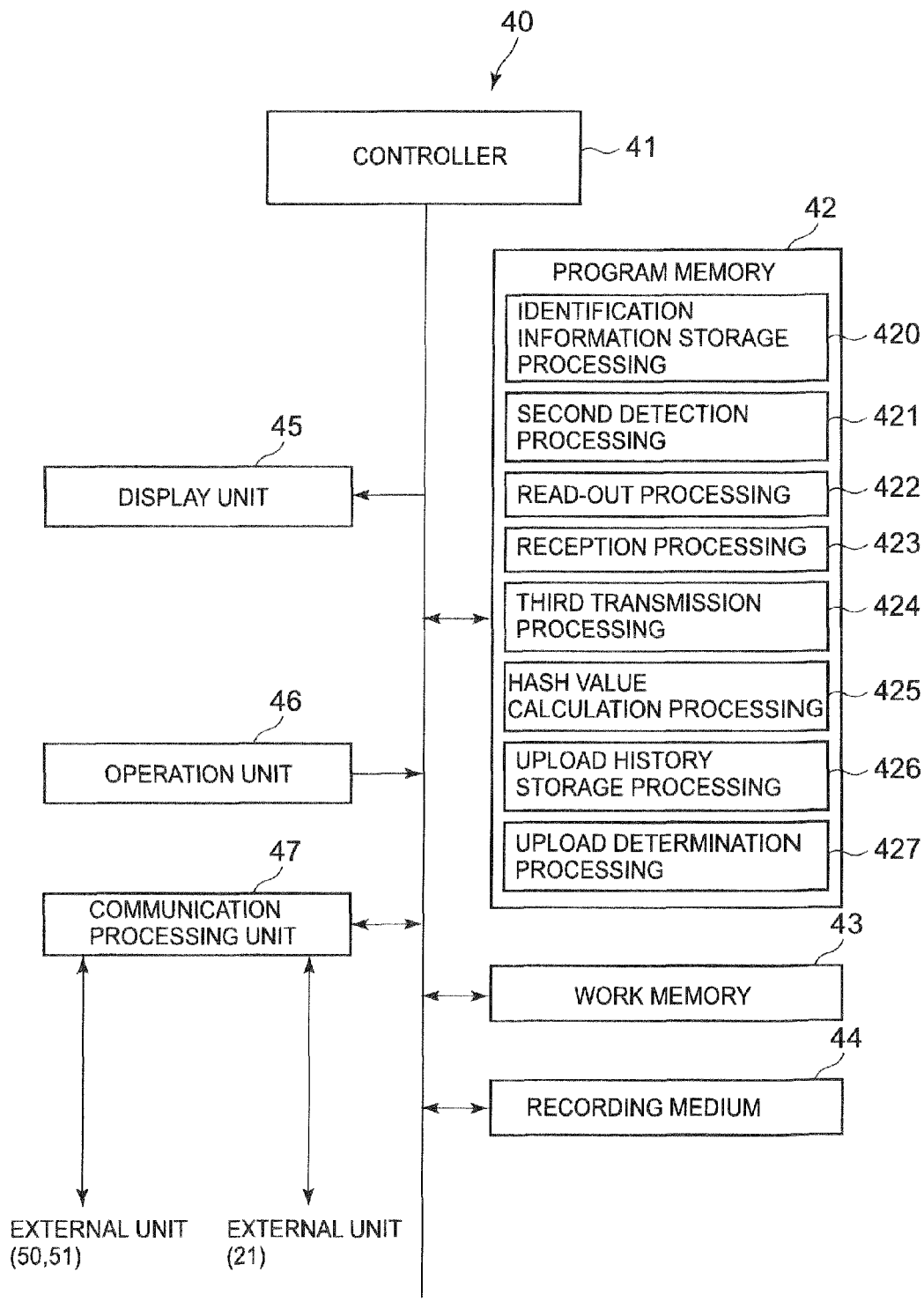
FIG. 7 is a block diagram illustrating a configuration of the PC (personal computer) of the embodiment.

FIG. 7 is a block diagram illustrating a configuration of the PC 40.

The PC 40 includes a controller 41 processing the entirety of the PC, a program memory 42, a work memory 43, a recording medium 44, a display unit 45, an operation unit 46, and a communication processing unit 47.

In the same diagram, the controller 41 consists of an arithmetic circuit such as a CPU and the like. Furthermore, the program memory 42, the work memory 43, and the recording medium 44 consist of SD-RAM, HDD (hard disk drive), or the like. In addition, the display unit 45 consists of a display device such as a CRT, LCD, or the like. Also, the operation unit 46 consists of a position designation device such as a character input device exemplified by a keyboard, a mouse, or a touchpad. Additionally, the communication processing unit 47 consists of a device equipped with an external connector, and has a function as a communication modem, or a plug-in function.

Furthermore, the program memory 42 stores an identification information storage processing program 420 for causing the controller 41, the work memory 43, and the recording medium 44 to function as an identification information storage means; a second detection processing program 421 for causing the controller 41 to function as a second detection means; a read-out processing program 422 for causing the controller 41 to function as a read-out means; a reception processing program 423 for causing the controller 41 and the communication processing unit 47 to function as a reception means; a third transmission processing program 424 for causing the controller 41 and the communication processing unit 47 to function as a third transmission means; a hash value calculation processing program 425 for causing the controller 41 to function as a hash value calculation means; an upload history storage processing program 426 for causing the controller 41, the work memory 43, and the recording medium 44 to function as an upload history storage means; and an upload determination processing program 427 for causing the controller 41 to function as an upload determination means. In addition, the controller 41, by the hereinafter described processing, loads these programs and executes processing thereof.

Moreover, in relation to each of the above-mentioned programs, identification information stored by the identification information storage processing program 420 for identifying the Web server 50 is stored in the recording medium 44.

The second detection processing program 421 is a program for causing the controller 41 to detect a connection with the digital camera 10.

The read-out processing program 422 is a program for causing the controller 41 to read out identification information stored in the recording medium 44 at a time of detecting a connection with the digital camera 10, by causing the controller 41 to execute the second detection processing program 421.

The reception processing program 423 is a program for causing the communication processing unit 47, under control of the controller 41, to receive image data transmitted by the second transmission processing unit 34.

The third transmission processing program 424 is a program for causing the communication processing unit 47 to upload into the Web server 50, through the communication network connection 51, the image data received by the reception processing program 423, based on identification information read out by the read-out processing program 422.

The hash value calculation processing program 425 is a program for causing the controller 41 to calculate a hash value of the image data received, by executing the reception processing program 423.

The upload history storage processing program 426 is a program for causing the recording medium 44 to store a hash value for image data for which uploading has already been completed, as upload history.

The upload determination processing program 427 is a program for causing the controller 41 to compare a hash value stored in the recording medium 44 by the upload history storage processing program 426, with a hash value for image data to be uploaded by the third transmission processing program 424, and in the case in which both hash values match each other, determine that uploading has been completed, and on the other hand, in the case in which the hash values do not match each other, determine that uploading has not been completed.

Here, the reason for having used a hash value as upload history is that, although a file name or a time stamp can be modified, a hash value obtained from image data cannot be modified, so an overlapping upload of the image data can be avoided.

Figure 8:
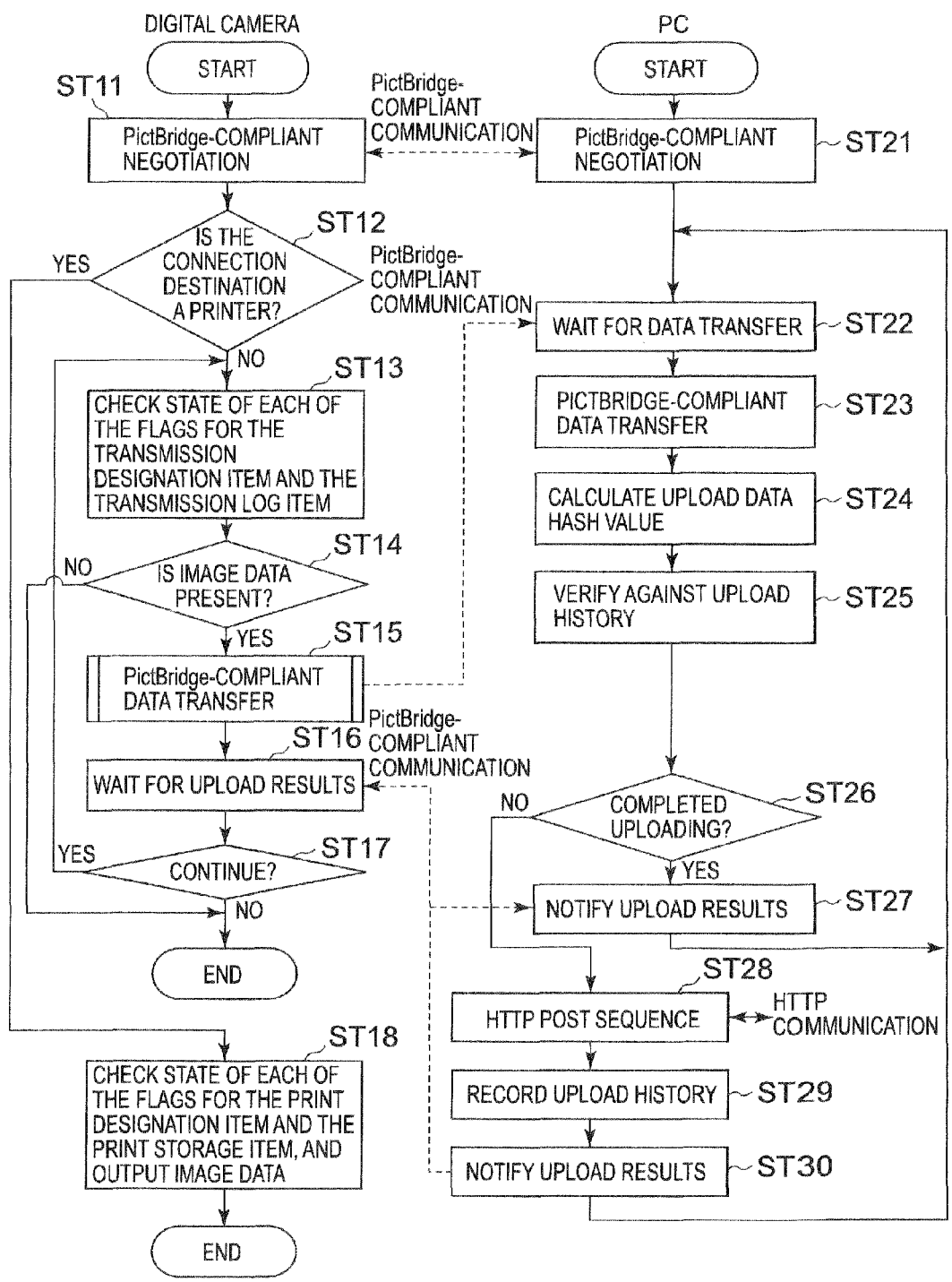
FIG. 8 is a flowchart illustrating operations of the digital camera and PC (personal computer) of the embodiment.

Next, behavior of a controller 30 of the digital camera 10 and the controller 41 of the PC 40 are described with reference to a flowchart of FIG. 8.

First, the controller 41 of the PC 40 is connected with the Web server 50 through the communication network connection 51. In this state, the user connects the digital camera 10 to the PC 40 by a USB-compliant connection.

When a connection by a USB-compliant connection is detected, each of the controllers 30 and 41 of the digital camera 10 and the PC 40 loads and prepares to execute each program from each of their program memories 18 and 42. Additionally, the controller 41 causes the communication processing unit 47 to carry out PictBridge (registered trademark)-compliant communication negotiation with the digital camera 10, and establish communication (Steps ST11 and ST21). Then, the controller 41 reaches a state of waiting for execution of a data transfer from the digital camera 10 (Step ST22).

On the other hand, the connection destination determination processing unit 32 of the controller 30 of the digital camera 40, by the PictBridge (registered trademark)-compliant communication negotiation, determines whether the external apparatus connected thereto is the PC 40 or the printer 60 (Step ST12). In relation to this determination, for example, a method for determining whether the external apparatus connected thereto is the PC 40 or the printer 60 based on an IP address included in the data transmitted through the above-mentioned negotiation, or a method for determining based on whether an instruction unique to the printer has been added to the transmitted data, can be given.

When the connection destination has been determined by the connection destination determination processing unit 32 to be the PC 40, the controller 30 checks states of flags of the transmission designation item 177 and the transmission log item 178 of the file management area 172 (Step ST13).

Next, it is sequentially determined whether or not image data exists for which "1" has been set for the flag of the transmission designation item 177, and "0" has been set as a flag of the transmission log item 178 (Step ST14).

In the case in which it is determined that the image data does not exist, the present processing is terminated, but in the case in which it is determined that the image data does exist, this image data is transferred by way of PictBridge (registered trademark)-compliant communication to the PC 40 (Step ST15).

Then, the controller 30 waits for the result of the upload transmitted from the PC 40 (Step ST16).

On the other hand, the controller 41 of the PC 40 calculates a hash value of the image data transferred from the digital camera 10, that is to say, the image data to be uploaded (Step ST24).

Next, the hash value calculated in Step ST24 is verified against hash values of the image data so far stored in the recording medium 44 by the upload history storage processing program 426 (Step ST25), and it is determined whether or not the image data to be uploaded has been uploaded (Step ST26). In the case in which this determination is "YES", the control goes forward to Step ST27, and in the case of "NO", the control goes forward to Step ST28.

In the case in which the image data that is the object of the upload has already been uploaded, that is to say, in the case in which the determination is "YES" in Step ST26, uploading is not carried out for the image data specified by this hash value, and the information that uploading has been completed is output to the digital camera 10 in a state of waiting for results of the upload (Step ST27).

On the other hand, in the case that the image data that is the object of the upload has not been uploaded, that is to say, in the case in which the determination is "NO" in Step ST26, HTTP (HyperText Transfer Protocol) communication with the Web server 50 is carried out using the HTTP POST sequence for the communication processing unit 47, the image data is uploaded (Step ST28), and a hash value of this uploaded image data is stored in the recording medium 44 (Step ST29).

The above-mentioned upload history, more specifically, as illustrated in FIG. 9, is displayed on the display unit 45 of the PC 40. This upload history is composed of the file name 401, creation date and time 402, file size 403, upload date and time 404, and the like, of data for which uploading has been executed.

In addition, information that the upload of the image data that is the object of the upload has been completed is output to the digital camera 10 in a state of waiting for results of the upload (Step ST30).

On the other hand, the digital camera 10, upon receiving a result indicative that the upload has been completed in Step ST16, sets a flag "1" for the transmission log item 178 corresponding to the transmitted image data, and then waits for a selection of whether to continue the upload operation. In the case of detecting "continue", it returns to Step ST13. On the other hand, in the case in which this determination is "NO", the present processing is terminated.

Furthermore, in the case in which a determination is made in Step ST12 that the connection destination is the printer 60, the controller 30 checks the states of the flags of the print designation item 175 and the number of copies item 176 of the file management area 172, and in relation to the image data for which "1" has been set as a flag of the print designation item 175, awaits a designation of the number of copies stored in the number of copies item 176. When printing is designated by a prescribed operation of a user, the corresponding image data is output to the printer 60 (Step ST18), and the present processing is terminated.

From the foregoing description, it is to be understood that, the following effects are provided by the present embodiment.

(1) By just connecting the digital camera 10 to the PC 40, a determination is made as to whether the connection destination is a PC (transmission device) or a printer (printing device), and according to this determination result, it is possible to separate the image data designated to be transmitted from the image data designated to be printed.

(2) Each time that image data is attempted to be uploaded, a hash value of the image data that is the object of the upload is verified against hash values of the upload history. Thereby, it is possible to prevent overlapping uploading of identical data.

(3) Since the upload history has been stored in the storage of the PC 40, the storage of the digital camera 10 is not used up, compared to the case of having stored the upload history in the storage of the digital camera 10 with a smaller capacity than the PC 40.

(4) Even if a user generates image data using a plurality of digital cameras 10, it is possible centrally to manage the upload history at the PC 40.

Moreover, the present invention is not limited to the above-described embodiments, and changes in form, improvements, and the like within a scope of being able to achieve the objective of the present invention are included.

For example, it has been described in the present embodiment that the digital camera 10 and the Web server are linked with each other using the PC 40, but the present invention need not be limited to this. That is to say, as long as an apparatus includes a connection interface with a digital camera, and includes a connection interface with the communication network, any configuration is acceptable.

Furthermore, in the PC 40, an upload history was displayed, but the invention need not be limited to this, and a configuration not having a display unit is acceptable.

What is claimed is:

1. An image transmission system comprising:
   an image storage device comprising:
      image storage means for storing a plurality of image data;
      information storage means for storing print request information requesting printing of an image, and transmission request information requesting transmission of the image data to an external unit, for each of the plurality of image data stored in the image storage means;
      first detection means for detecting a connection with the external unit;
      connection destination determination means for determining whether a connection destination is a printing device, or an external apparatus different from the printing device, when a connection with the external unit is detected by the first detection means;
      first transmission means for reading out the print request information stored in the information storage means, reading out from the image storage means image data which is associated with the print request information, and transmitting the image data to the printing device, when it has been determined by the connection destination determination means that the connection destination is the printing device; and
      second transmission means for reading out the transmission request information stored in the information storage means, reading out from the image storage means image data which is associated with the transmission request information, and transmitting the image data to the external apparatus, when it has been determined by the connection destination determination means that the connection destination is the external apparatus; and
   a first external apparatus comprising:
      reception means for receiving image data transmitted by the second transmission means; and
      third transmission means for transmitting to a second external apparatus, through a communication network connection, the image data received by the reception means;
   wherein:
      the second external apparatus has identification information allowing the second external apparatus to be identified through the communication network connection;
      the first external apparatus further comprises:
         identification information storage means for storing the identification information;
         second detection means for detecting a connection with the image storage device; and
         read-out means for reading out the identification information stored in the identification information storage means, when a connection with the image storage device is detected by the second detection means; and
      the third transmission means transmits to the second external apparatus, based on the identification information read out by the read-out means, the image data received by the reception means.

2. The image transmission system as set forth in claim 1, wherein the image storage device further comprises image pickup means for imaging a subject and generating image data, and control means for storing the image data generated by the image pickup means in the image storage means.

3. An image transmission system comprising:
   an image storage device comprising:
      image storage means for storing a plurality of image data;
      information storage means for storing print request information requesting printing of an image, and transmission request information requesting transmission of the image data to an external unit, for each of the plurality of image data stored in the image storage means;
      first detection means for detecting a connection with the external unit;
      connection destination determination means for determining whether a connection destination is a printing device, or an external apparatus different from the printing device, when a connection with the external unit is detected by the first detection means;
      first transmission means for reading out the print request information stored in the information storage means, reading out from the image storage means image data which is associated with the print request information, and transmitting the image data to the printing device, when it has been determined by the connection destination determination means that the connection destination is the printing device; and second transmission means for reading out the transmission request information stored in the information storage means, reading out from the image storage means image data which is associated with the transmission request information, and transmitting the image data to the external apparatus, when it has been determined by the connection destination determination means that the connection destination is the external apparatus; and a first external apparatus comprising:
reception means for receiving image data transmitted by the second transmission means; and
third transmission means for transmitting to a second external apparatus, through a communication network connection, the image data received by the reception means;

wherein:
the information storage means of the image storage device further stores transmission log information indicating whether or not transmission of the image data has completed for each of the plurality of image data stored in the image storage means; and
the second transmission means of the image storage device, based on transmission completion information stored in the information storage means, reads out un-transmitted image data from the image storage means, and transmits the un-transmitted image data to the second external apparatus.

4. The image transmission system as set forth in claim 3, wherein the image storage device further comprises image pickup means for imaging a subject and generating image data, and control means for storing the image data generated by the image pickup means in the image storage means.

5. An image storage device comprising:
image storage means for storing a plurality of image data;
information storage means for storing print request information requesting printing of an image, and transmission request information requesting transmission of the image data to an external unit, for each of the plurality of image data stored in the image storage means;
first detection means for detecting a connection with the external unit;
connection destination determination means for determining whether a connection destination is a printing device, or an external apparatus different from the printing device, when a connection with the external unit is detected by the first detection means;
first transmission means for reading out the print request information stored in the information storage means, reading out from the image storage means image data which is associated with the print request information, and transmitting the image data to the printing device, when it has been determined by the connection destination determination means that the connection destination is the printing device; and
second transmission means for reading out the transmission request information stored in the information storage means, reading out from the image storage means image data which is associated with the transmission request information, and transmitting the image data to the external apparatus, when it has been determined by the connection destination determination means that the connection destination is the external apparatus;

wherein:
the information storage means of the image storage device further stores transmission log information indicating whether or not transmission of the image data has completed for each of the plurality of image data stored in the image storage means; and
the second transmission means of the image storage device, based on transmission completion information stored in the information storage means, reads out un-transmitted image data from the image storage means, and transmits the un-transmitted image data to a second external apparatus.

6. The image storage device as set forth in claim 5, further comprising image pickup means for imaging a subject and generating image data, and control means for storing the image data generated by the image pickup means in the image storage means.

7. A non-transitory computer readable recording medium having a program stored thereon which is executable by a computer comprising image storage means for storing a plurality of image data and information storage means for storing print request information requesting printing of an image, and transmission request information requesting transmission of the image data to an external unit, for each of the plurality of image data stored in the image storage means, the program controlling the computer to function as:
first detection means for detecting a connection with the external unit;
connection destination determination means for determining whether a connection destination is a printing device, or an external apparatus different from the printing device, when a connection with the external unit is detected by the first detection means;
first transmission means for reading out the print request information stored in the information storage means, reading out from the image storage means image data which is associated with the print request information, and transmitting the image data to the printing device, when it has been determined by the connection destination determination means that the connection destination is the printing device; and
second transmission means for reading out the transmission request information stored in the information storage means, reading out from the image storage means image data which is associated with the transmission request information, and transmitting the image data to the external apparatus, when it has been determined by the connection destination determination means that the connection destination is the external apparatus;

wherein:
the information storage means of the image storage device further stores transmission log information indicating whether or not transmission of the image data has completed for each of the plurality of image data stored in the image storage means; and
the second transmission means of the image storage device, based on transmission completion information stored in the information storage means, reads out un-transmitted image data from the image storage means, and transmits the un-transmitted image data to a second external apparatus.

8. A method for an image storage device comprising image storage means for storing a plurality of image data and information storage means for storing print request information requesting printing of an image, and transmission request information requesting transmission of the image data to an external unit, for each of the plurality of image data stored in the image storage means, the method comprising:

detecting a connection with the external unit;

determining whether a connection destination is a printing device, or an external apparatus different from the printing device, when a connection with the external unit is detected;

reading out the print request information stored in the information storage means, reading out from the image storage means image data which is associated with the print request information, and transmitting the image data to the printing device, when it has been determined that the connection destination is the printing device; and reading out the transmission request information stored in the information storage means, reading out from the image storage means image data which is associated with the transmission request information, and transmitting the image data to the external apparatus, when it has been determined that the connection destination is the external apparatus;

wherein the information storage means of the image storage device further stores transmission log information indicating whether or not transmission of the image data has completed for each of the plurality of image data stored in the image storage means; and wherein the method further comprises, based on transmission completion information stored in the information storage means, reading out un-transmitted image data from the image storage means, and transmitting the un-transmitted image data to a second external apparatus.

* * * * *